(12) United States Patent
Jokschas et al.

(10) Patent No.: US 10,105,626 B2
(45) Date of Patent: *Oct. 23, 2018

(54) SEALING DEVICE OF A FILTER SYSTEM FOR FILTERING FLUIDS

(71) Applicant: MANN+HUMMEL GMBH, Ludwigsburg (DE)

(72) Inventors: Guenter Jokschas, Murrhardt (DE); Marco Schweikart, Ludwigsburg (DE); Martin Weindorf, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 630 days.

This patent is subject to a terminal disclaimer.

(21) Appl. No.: 14/263,126

(22) Filed: Apr. 28, 2014

(65) Prior Publication Data

US 2014/0230389 A1 Aug. 21, 2014

Related U.S. Application Data

(63) Continuation of application No. 12/851,361, filed on Aug. 5, 2010, now Pat. No. 8,727,134.

(30) Foreign Application Priority Data

Aug. 11, 2009 (DE) .......................... 10 2009 036 916

(51) Int. Cl.
*B01D 35/00* (2006.01)
*B01D 46/00* (2006.01)
(Continued)

(52) U.S. Cl.
CPC ......... *B01D 46/0004* (2013.01); *B01D 29/21* (2013.01); *B01D 35/005* (2013.01);
(Continued)

(58) Field of Classification Search
None
See application file for complete search history.

(56) References Cited

U.S. PATENT DOCUMENTS

3,675,777 A * 7/1972 Heskett ................. B01D 29/111
210/232
4,204,960 A * 5/1980 Sugiyama ............. B01D 29/111
210/232
(Continued)

*Primary Examiner* — Richard C Gurtowski
(74) *Attorney, Agent, or Firm* — James Hasselbeck (57) ABSTRACT

A sealing device (24) of a filter system (10) for filtering fluids, in particular of a motor vehicle, with a sealing ring (26) is described. The sealing ring (26) serves to seal a pipe (16), in particular a central pipe of a filter housing (12), that penetrates through a flange-sided opening (18) of an end plate (20), in particular of an end element of a filter element (14). The sealing ring (26) features a central section (58) that connects it with the end plate (20). The sealing ring (26) features in its axial direction on both sides of the central section (58) elastic sealing sections (60, 62) which cause each a reduction of the inner diameter of the sealing ring (26) compared with the central section (58). The elastic sealing sections (60, 62) extend freely flexibly and can be bent away from the central section (58) such that they can be pressed—when the pipe (16) is mounted—by means of prevailing fluid pressures—when the filter system (10) is operated—in radial direction against the exterior wall of the pipe (16).

14 Claims, 5 Drawing Sheets

(51) Int. Cl.
*B01D 29/21* (2006.01)
*B01D 35/153* (2006.01)
*B01D 36/00* (2006.01)
*F01M 11/03* (2006.01)
*F02M 37/22* (2006.01)

(52) U.S. Cl.
CPC ......... *B01D 35/153* (2013.01); *B01D 36/001* (2013.01); *F01M 11/03* (2013.01); *F02M 37/22* (2013.01); *B01D 2201/0415* (2013.01); *B01D 2201/291* (2013.01); *B01D 2201/305* (2013.01); *B01D 2201/34* (2013.01); *B01D 2201/4084* (2013.01)

(56) References Cited

U.S. PATENT DOCUMENTS

| | | | | |
|---|---|---|---|---|
| 4,406,786 A | * | 9/1983 | Hein | B01D 29/05 |
| | | | | 210/223 |
| 5,580,456 A | * | 12/1996 | Bowlsbey | B01D 29/111 |
| | | | | 156/69 |

* cited by examiner

SEALING DEVICE OF A FILTER SYSTEM FOR FILTERING FLUIDS

CROSS REFERENCE TO RELATED APPLICATIONS

This application is a continuation of U.S. Ser. No. 12/851,361 filed Aug. 5, 2010. U.S. Ser. No. 12/851,361 claims the benefit under 35 USC 119 of foreign application DE 10 2009 036 916.3 filed in Germany on Aug. 11, 2009, and which is hereby incorporated by reference in its entirety.

TECHNICAL FIELD

The invention relates to a filter element and a sealing device of a filter system for filtering fluids with a sealing ring for sealing a pipe penetrating through the opening of a wall of an end element of a filter element, the sealing ring featuring a central section which connects it with the wall and the sealing ring featuring elastic sealing sections in its axial direction on both sides of the central section which cause a reduction of the inner diameter of the sealing ring compared with the central section.

BACKGROUND OF THE INVENTION

Such filter systems and filter elements are used for filtering gaseous or liquid fluids. Such filter systems for filtering in particular combustion or compressed air, fuel, in particular diesel or gasoline, or engine oil are used in motor vehicles and industrial engines.

An elastic sealing ring is known from DE 1 699 567 which features at its interior side two sealing beads between which a central section of larger diameter adjacent to the reveal of the wall breakthrough is disposed which remains inactive for the sealing. When inserting the pipe through the wall the sealing material in the area of the sealing beads is radially displaced. The sealing effect depends on the reset force of the sealing beads.

There remains a need in the art for a sealing device and a filter element of the type mentioned above which has an improved sealing effect.

SUMMARY OF THE INVENTION

An object of the present invention is to provide an elastic seal ring having elastic sealing sections that extend freely flexibly and can be bent away from the central section such that they can be pressed by means of prevailing fluid pressures—when the pipe is mounted—in radial direction against the exterior wall of the pipe when the filter system is in operation.

According to the invention, the sealing sections are strongly pressed against the exterior wall of the pipe by means of propulsion forces resulting from pressure differences at the opposing sides of the sealing sections. The contact areas of the sealing sections together with the exterior wall of the pipe realize the respective sealing surfaces of the sealing sections. This improves the sealing effect. When the filter system is in operation, the pressure differences are created because of the fact that less pressure is exerted at the sides of the elastic sealing sections facing the interior of the sealing ring than at the sides facing away from the interior. Any manufacturing-induced tolerances between the outer diameter of the pipe and the inner diameter of the sealing ring and/or the mounting position are compensated by bending the sealing sections. When unpressurized, in particular when the filter system is not in operation, the contact pressures are reduced so that the risk of swelling of the sealing ring or sticking to the exterior wall of the pipe is reduced. As a result, the sealing sections can have a considerably softer design, that means with less reset force, than the sealing sections of sealing rings known from prior art without reducing the sealing effect. This has a positive effect on the effort needed for mounting and dismounting the pipe. Due to the flexibility of the sealing sections, operational position changes of the pipe's exterior wall relative to the wall opening, in particular due to vibrations, are also compensated during the operation of the filter system.

In an advantageous embodiment, the sealing ring can be disposed such that—when the pipe is mounted—a fluid opening of the pipe is disposed in axial direction between the sealing surfaces—which are adjacent to the pipe's exterior wall—of the sealing ring's sealing sections and tightly closed with the sealing ring. In this way, the sealing ring realizes an additional sealing function so that a further closure or sealing device is not required for the fluid opening. The fluid opening is automatically closed by means of the sealing flange when inserting the pipe and opened when pulling out the pipe. The sealing sections' interior sides facing the pipe can receive a pressure via the already existing fluid opening which is lower than the pressure at the sealing sections' exterior sides.

Advantageously, the fluid opening can feature a connection with the filter system's return duct. When pulling the pipe out of the wall opening the return duct is automatically opened so that fluid contained in the filter system can be discharged via the return duct. This is especially advantageous if the wall is an end element of a filter element so that the filter housing can be automatically emptied when removing the filter element.

Furthermore, the sealing ring can advantageously tightly separate a clean fluid side of the filter system from a raw fluid side. Thus, the sealing ring avoids mixing of filtered clean fluid with unfiltered raw fluid.

In another advantageous embodiment, defined areas for applying respective pressures can be realized each at the interior sides facing the interior of the sealing ring and the sealing sections' exterior sides facing away from the interior of the sealing ring. These areas can be specified in particular by defined gaps or other volumes which are adjacent to the sealing sections. The respective pressures can build up uniformly in these areas in order to realize a sealing effect which is optimal for applying pressure to the sealing sections.

The sealing ring's central section can be connected advantageously with the wall by means of vulcanization in a stable and easy manner.

The sealing ring and the wall can be realized advantageously as two-component part. Two-component parts can be realized easily and are characterized by a stable connection.

In another advantageous embodiment, the sealing ring can be tied to or into the wall by means of tying or plug-in devices. The advantage of such a connection is that it is easily realizable, stable and detachable.

Furthermore, the wall can be made advantageously of plastic material and/or the sealing ring of elastomer. Elastomers are well suited to realize soft and elastic components. Stable and also complex walls can be manufactured easily with plastic material.

Furthermore, this task is solved according to the invention by the filter element, the elastic sealing sections of which extend freely flexibly and can be bent away from the central section such that they can be pressed—when the pipe is mounted—against the exterior wall of the pipe by means of prevailing fluid pressures when the filter system is in operation. The advantages explained above apply also to the filter element.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to sealing device of a filter apparatus. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
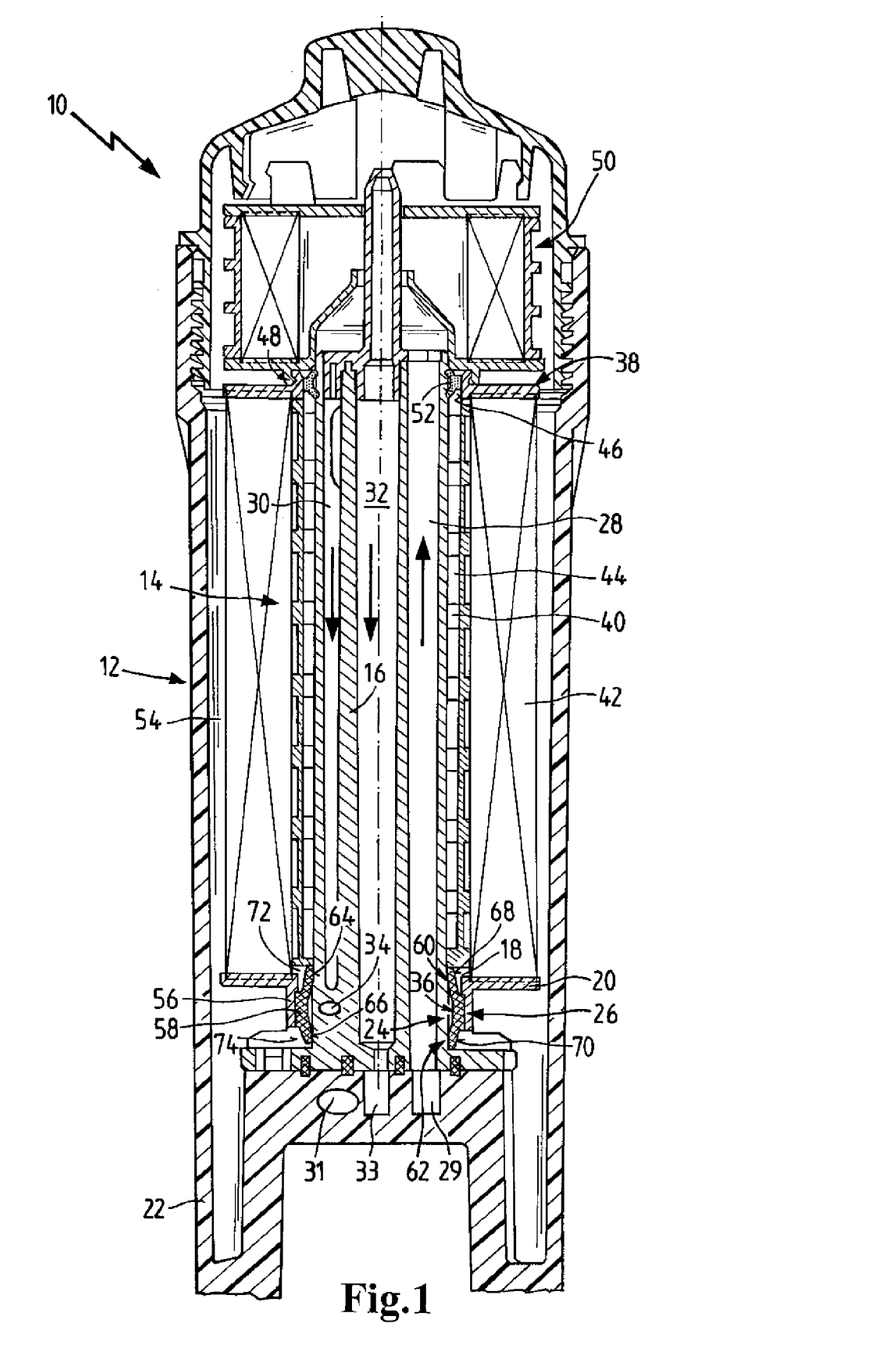
FIG. 1 is a schematic sectional view of a filter system for fuel of an internal combustion engine of a motor vehicle with a first example of an embodiment of a filter element, consistent with the present invention.

FIG. 1 shows a filter system 10 for filtering liquid fuels of a motor vehicle's internal combustion engine not shown here.

The filter system 10 comprises a filter housing 12 in which a filter element 14 is replaceably disposed according to a first example of an embodiment. FIG. 3 shows a detailed view of the filter element 14. The filter element 14 is attached to a central tube 16 of the filter housing 12 in axial direction. The central tube 16 is attached at the bottom of the filter housing 12 by means of a connection flange 22. The central tube 16 penetrates through a flange-sided end plate opening 18 of a flange-sided end plate 20 of the filter element 14 which is shown in detail in FIGS. 2 and 3. A sealing device 24 with a sealing ring 26 made of an elastomer serves in the area of the flange-sided end plate opening 18 to seal the central tube 16 opposite to the end plate 20.

An inlet duct 28, an outlet duct 30 and a return duct 32 which are each open towards a corresponding connection duct 29, 31 respectively 33 in the connection flange 22 extend in axial direction in the central tube 16. The inlet duct 28 is connected via the connection duct 29 with a fuel tank not shown here from which the fuel to be filtered can be conveyed to the filter system 10. The lower part of the outlet duct 30 in FIG. 1 passes outside of the sectional plane and is therefore not shown in FIG. 1. The filtered fuel can be conveyed through the outlet duct 30 to the internal combustion engine via the connection duct 31. To empty the filter housing 12, fuel remaining in the filter housing 12 after having removed the filter element 14 can be returned to the fuel tank via the return duct 32.

A drain channel 34 extends eccentrically in the central tube 16 transversely to its axis. The drain channel 34 leads at both of its ends into a recess shown in detail in FIG. 2. The recess 36 extends in the exterior wall of the central tube 16 in its circumferential direction. The drain channel 34 features a connection to the return duct 32 which is located outside of the drawing plane in FIG. 1 and therefore not shown. The drain channel 34 and the recess 36 are located in a lower section of the central tube 16 near the connection flange 22.

At its front side facing away from the connection flange 22 the filter element 20 features a second end plate 38 shown in FIG. 1, the bases of which run in parallel to those of the flange-sided end plate 20. A skeletal support tube 40 extends between both end plates 20 and 38. The end plates 20 and 38 and the support tube 40 are made of plastic material. The support tube 40 is surrounded by a filter medium 42 in the form of a filter bellows made of fanfold non-woven fabric. The support tube 40 defines an interior area 44 of the filter medium 42.

The end plate 38 facing away from the connection flange 22 has a concentric opening 46 towards the support tube 40. The end plate 38 features a hollow cylindrical connecting piece 48 which surrounds the opening 46 and extends at the axially outer base of the end plate 38 in axial direction. The connecting piece 48 serves to connect a coalescer element 50 which is of no interest here. The function of the coalescer element 50 is to improve the separation of water droplets from the fuel; it is disposed in the inlet area of the fuel in the upper section of the filter housing 12 shown in FIG. 1. An annular sealing 52 made of an elastomer which serves to seal the central tube 16 against the end plate 38 is attached at the radial interior side of the connecting piece 48. The annular sealing 52 is constructed in analogy to the sealing ring 26, the structure of which will be explained later in detail.

The filter medium 42 is surrounded by an inlet annular space 54 which is in fuel-conveying connection with the inlet duct 28 of the central tube 18 via the coalescer element 50. The filter medium 42 can be passed through radially from outside to inside from the inlet annular space 54 to the interior area 44 by the fuel to be filtered.

The flange-sided end plate opening 18 of the flange-sided end plate 20 is concentrically disposed towards the support tube 40. The flange-sided end plate 20 features a cylindrical receiving collar 56 which surrounds the flange-sided end plate opening 18 and extends away from the support tube 40 at the axial exterior side of the end plate 20 in axial direction.

The sealing ring 26 of the sealing device 24 is attached to the radial interior side of the receiving collar 56. The sealing ring 26 features a central section 58 which is connected with the receiving collar 56 by means of vulcanization.

The sealing ring 26 features two elastic lip-like sealing sections 60 and 62 in axial direction on both sides of the central section 58 which extend freely flexible and can be bent away basically axially with inclination radially inwards from the central section 58. The interior side 64 and 66 of the sealing sections 60 and 62 extend axially away from each other and are each inclined radially towards the interior of the sealing ring 26. Thus, the sealing sections 60 and 62 cause each a reduction of the inner diameter of the sealing ring 26 compared with the central section 58.

When attaching the filter element 14 to the central tube 16 the sealing sections 60 and 62 are bent radially outwards. In doing so, there will be no displacement or compression of the sealing material unlike the sealing ring known from prior art, for the exterior sides 68 and 70 facing away from the interior of the sealing ring 26 do not abut anywhere. The front sealing section 62 seen in attachment direction is pushed over the recess 36 during the attaching operation. In the mounting position of the filter element 10 shown in FIGS. 1 and 2 the drain channel 34 and the recess 36 are automatically disposed in axial direction between the sealing sections 60 and 62 of the sealing ring 26 and consequently tightly closed with the sealing ring 26. As a result, the interior sides 64 and 66 of the sealing sections 60 and 62 are placed over their full circumference in axial direction on both sides of the recess 36 at the exterior wall of the central tube 16. The contact areas of the interior sides 64 and 66 form sealing surfaces together with the exterior wall of the central tube 16. In this way, the sealing ring 26 separates additionally the clean fluid side in the interior area 44 of the filter medium 42 tightly from the raw fluid side in the inlet annular space 54.

When the filter system 10 is in operation, the sealing sections 60 and 62 are increasingly pressed against the exterior wall of the central tube 16 in radial direction by means of pressure differences between their interior sides 64 and 66 and their exterior sides 68 and 70. The sealing effect is thus improved and possible gaps between the sealing sections 60 and 62 and the exterior wall of the central tube 16 are closed.

The pressure exerted on the interior sides 64 and 66 of the sealing ring 26 corresponds to the pressure prevailing in the recess 36. The recess 36 forms a defined area of application where the pressure from the drain channel 34 can build up uniformly so that an optimal and uniform pressure exerted on the sealing sections 60 and 62 is ensured over the full circumference of the sealing ring 26.

The pressure exerted on the exterior side 68 of the sealing section 60 facing the interior area 44 is determined by the pressure in the interior area 44. Between the sealing section 60 and the interior wall of the receiving collar 56 a defined gap 72 is realized where the pressure from the interior area 44 can build up uniformly, ensuring a uniform application of pressure over the full circumference of the sealing section 60.

The pressure exerted on the exterior side 70 of the sealing section 62 facing away from the interior area 44 is determined by the pressure in the inlet annular space 54. Between this sealing section 62 and the connection flange 22 a defined area of application 74 is also realized where the pressure from the inlet annular space 54 can build up, ensuring a uniform application of pressure over the full circumference of the sealing section 62.

When operating the filter system 10, a corresponding system pressure is maintained in the interior area 44 and the inlet annular space 54. The system pressures can also be identical. Normally, the same pressure as in the fuel tank which is lower than the system pressures is maintained in the return duct 32, in the drain channel 34 and in the recess 36. When operating the filter system 10, altogether lower pressures are exerted on the interior sides 64 and 66 of the sealing sections 60 and 62 than on the exterior sides 68 and 70, leading to the above mentioned pressure differences.

When the filter system 10 is out of operation, the system pressures decrease, reducing the corresponding pressure difference and consequently also the corresponding contact pressure which presses the sealing sections 60 and 62 against the exterior wall of the central tube 16. Thus, the filter element 14 can be removed from the central tube 16 with less effort compared with the sealing rings known from prior art which must have a higher radial prestress to obtain a comparable sealing effect.

When removing the filter element 14 from the central tube 16, the recess 36 and the openings of the drain channel 34 are automatically freed by the sealing ring 26 so that the fuel remaining in the inlet annular space 54 can flow back via the drain channel 34, the return duct 32 and the connection duct 33 into the fuel tank. In doing so, the room of the filter housing 12 where the filter element 14 is located is automatically emptied when the filter element 14 is removed.

Figure 2:
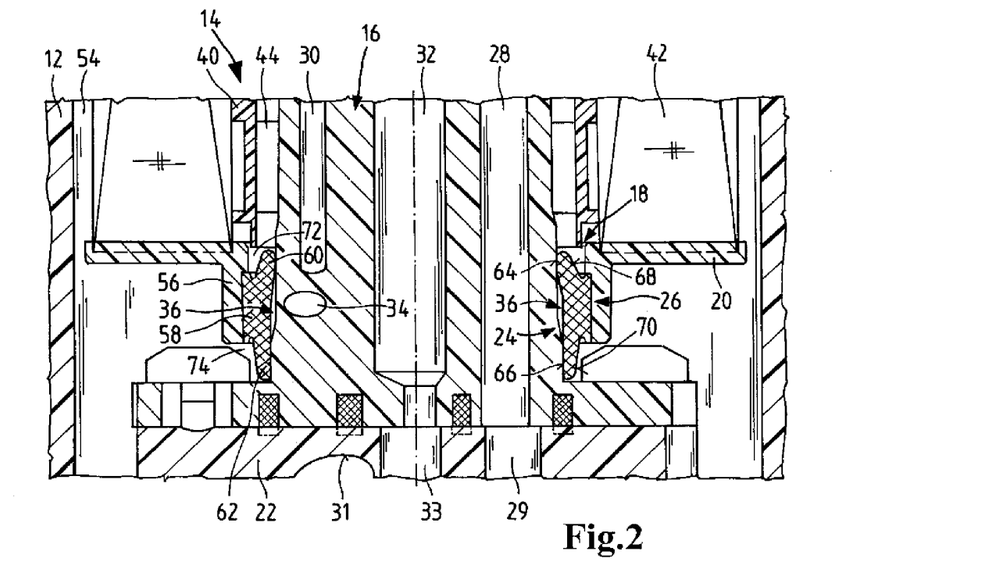
FIG. 2 is a schematic detailed view of the filter system of FIG. 1 in the area of a sealing device between the filter element and a central tube of the filter housing.
Figure 3:
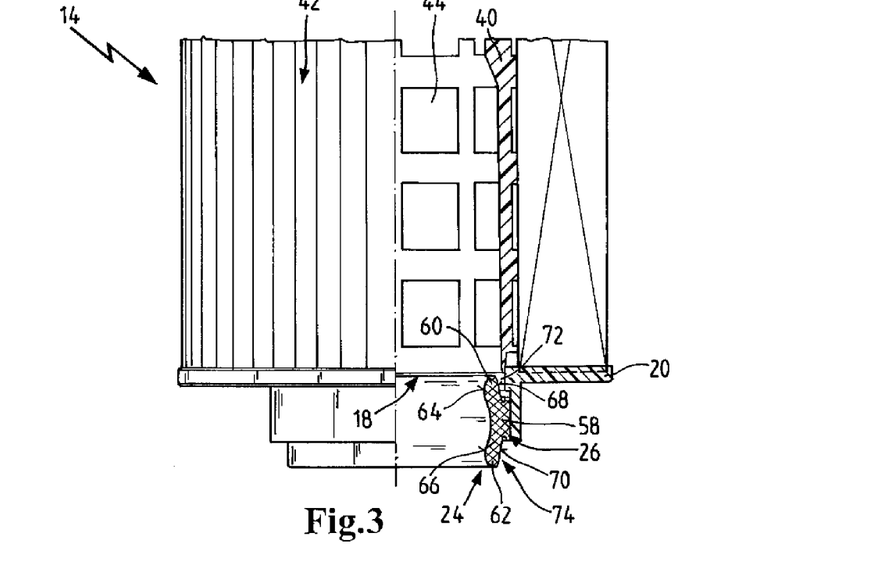
FIG. 3 is a schematic half-sectional view of the filter element of the filter system of FIGS. 1 and 2 in the area of the sealing device.
Figure 4:
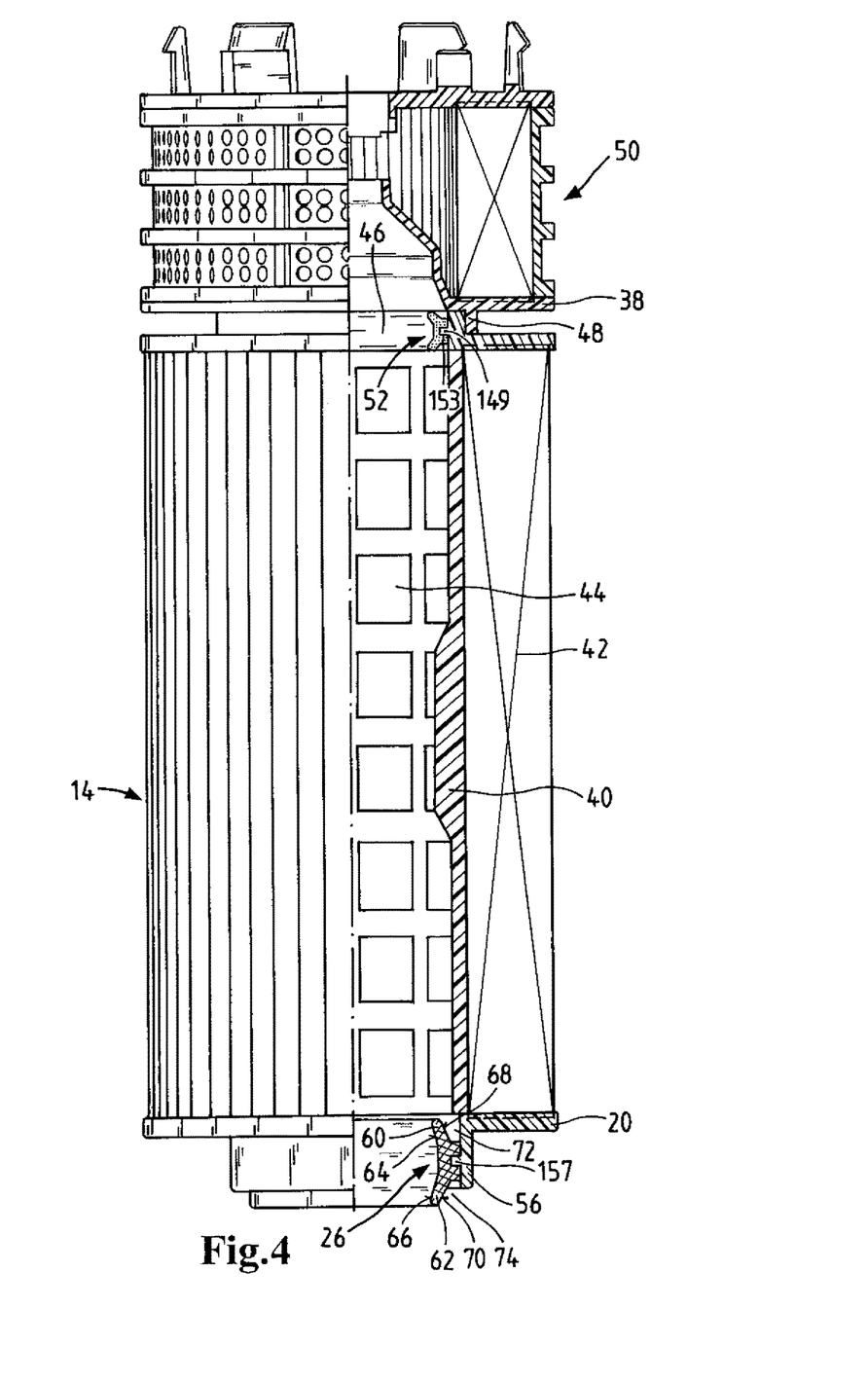
FIG. 4 is a schematic half-sectional view of a second example of an embodiment of a filter element of the filter system of FIG. 1.
Figure 5:
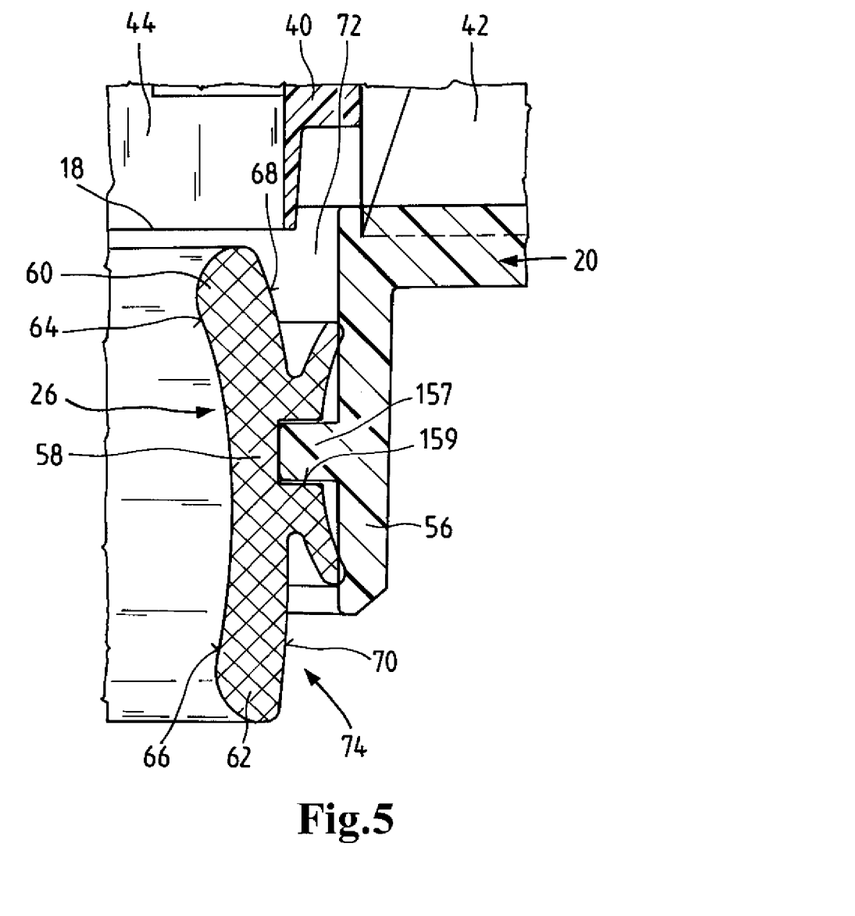
FIG. 5 is a schematic detailed view of the filter element of FIG. 4 in the area of a sealing ring at the side of a connection flange of the filter system of FIG. 1.
Figure 6:
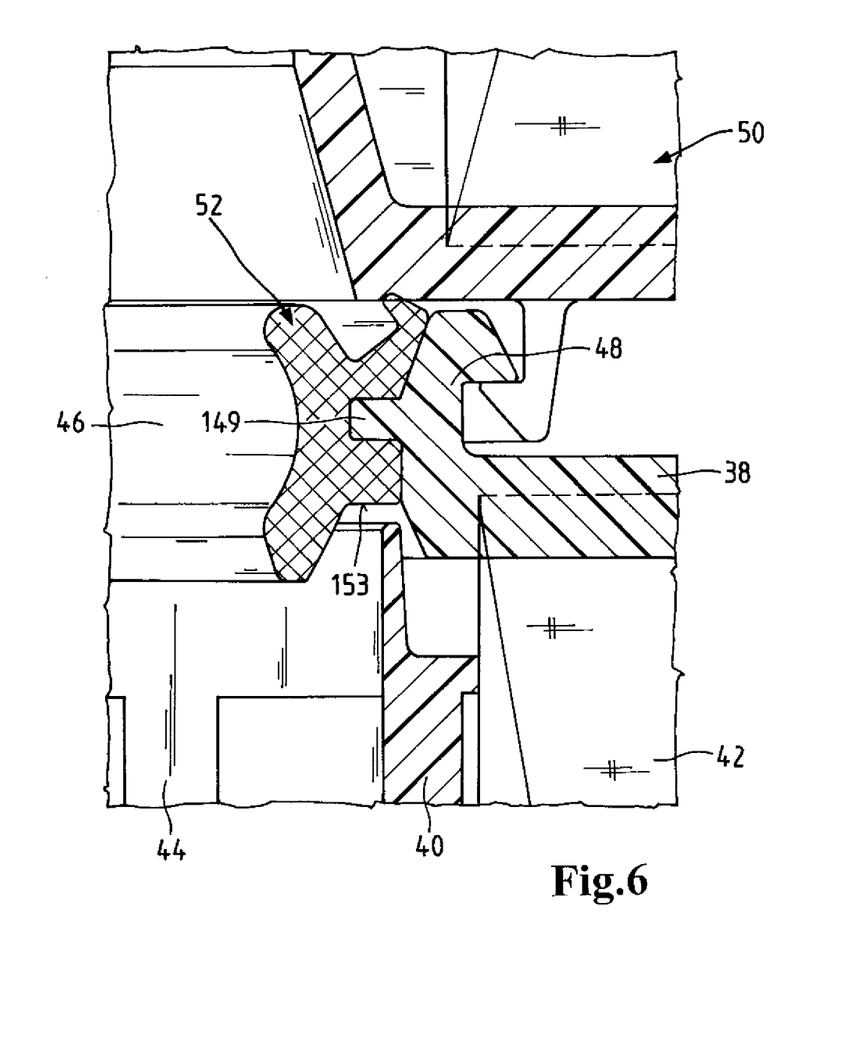
FIG. 6 is a schematic detailed view of the filter element of FIG. 4 in the area of an annular sealing at the side of a coalescer element of the filter system.

In a second example of an embodiment of a filter element 14, shown in FIGS. 4 to 6, those elements similar to those of the first example of an embodiment described in FIGS. 1 to 3 are provided with the same reference numerals so that with regard to their description reference is made to the explanations of the first example of an embodiment. The filter element 14 according to the second example of an embodiment can be inserted into the filter housing 12 of the filter system 10 according to FIG. 1 instead of the filter element shown in FIGS. 1 to 3. The second example of an embodiment differs from the first one by the fact that the sealing ring 26 is tied into the receiving collar 56. For this purpose, the receiving collar 56 features a plug-in bar 157 which extends at the radial interior side of the receiving collar 56 circumferentially radially inwards. Instead of the uninterrupted plug-in bar 157 it is also possible to use an interrupted plug-in bar. The central section 58 has a corresponding circumferential groove 159 in the radial exterior side into which the plug-in bar 157 is plugged in when the sealing ring 26 is tied in. Consequently, in the second example of an embodiment the sealing ring 26 and the receiving collar 56 can again be separated from each other.

Another difference between the first and the second example of an embodiment is that analogous to the sealing ring 26 the annular sealing 52 is tied into the connecting piece 48. For this purpose, the connecting piece 48 features at the radial interior circumferential side a plug-in bar 149 and the annular sealing 52 a corresponding circumferential groove 153 at its radial exterior side.

In the above described examples of an embodiment of a sealing device 24 the following modifications are among others possible:

The invention is not limited to filter systems 10 of internal combustion engines in motor vehicles. In fact, it can also be used in other sectors for filtering liquid or gaseous fluids, for example in industrial engines.

Instead in conjunction with an end plate 20 it is possible to use the sealing ring 26 also for sealing, in the area of an opening, a different wall through which a pipe differing from a central tube 16 can penetrate.

Instead of the two openings of the drain channel 34 only one or more than two fluid openings can be provided which can be tightly closed with the sealing ring 26.

The sealing ring 26 and the receiving collar 56 can also be realized as two-component part.

The receiving collar 56 can also be made of another material, for example metal, instead of plastic material.

Instead of an elastomer, the sealing ring 26 can be made of another elastic, flexible material suitable for sealing purposes.

The filter element 14 can also feature a different filter medium.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter element with a sealing arrangement, comprising:
   a first end plate;
   a second end plate spaced axially away from the first end plate;
   an elongated support tube extending axially from the first end plate to the second end plate;
   a filter medium circumferentially surrounding and arranged directly on the support tube, the support tube arranged in an interior area of the filter medium, the filter medium connected at axially opposing ends to the first end plate and the second end plate;
   the first end plate having a flange-sided end plate opening extending through the first end plate, the first end plate arranged at and secured onto a first axial end of the filter element;
   a tubular collar formed on the first end plate onto an axial exterior surface of the first end plate and extending axially outwardly away from the filter medium and the end plate in a direction axially outwardly away from the interior area of the filter medium, the tubular collar circumferentially surrounding the flange-sided end plate opening, the tubular collar arranged at an axial exterior of the filter element;
   a tubular seal ring mounted onto a radial interior side of the tubular collar at an axial outward spacing away from the first end plate, the tubular seal ring including
      a central section fixedly mounted onto said radial interior side of said tubular collar;
      elastic sealing sections formed at axially opposing ends of the tubular seal ring on opposing sides of said central section, the elastic sealing sections elastically defecting in a radial direction causing a reduction each of an inner diameter of said tubular seal ring compared with said central section of said seal ring;
      wherein said elastic sealing sections are elastically flexible to bend radially outwardly away from said central section;
      wherein said elastic sealing sections are operative to sealably press in a radial inward direction against an exterior wall of another tubular member to be received within the tubular seal ring, the elastic sealing sections sealing radially between said tubular member and said end plate;
      wherein a sealing force pressing said elastic sealing sections against said tubular member is augmented by prevailing fluid pressures acting on a radially exterior side of said elastic sealing sections; and
      wherein the tubular seal ring is a separate component from the tubular collar and is made of an elastic, flexible material different from the material of the tubular collar;
   wherein the tubular collar includes a radially inwardly extending projection formed on the radial interior side of the tubular collar and extending radially away from the radial interior side of the tubular collar;
      wherein the radially inwardly extending projection forms a plug in bar;
      wherein the tubular seal ring has a circumferential groove forming into the radial exterior side of the tubular seal ring, the radially inwardly extending projection of the tubular collar is received into the circumferential groove of the tubular seal ring, thereby securing the tubular seal ring to the tubular collar and the first end plate.

2. The filter element according to claim 1, wherein the tubular collar is monolithically and integrally formed with the first end plate on the axial exterior surface of the first end plate, the tubular collar a one piece continuous component of same material with the first end plate.

3. The filter element according to claim 1, wherein the tubular seal ring is permanently and integrally secured onto the radial interior side of the tubular collar, the securing by vulcanization of the tubular seal ring onto the radial interior side of the tubular collar.

4. The filter element according to claim 1, wherein
the tubular seal ring includes two radially outwardly extending wall members forming opposing sidewalls of the circumferential groove;
wherein resilient leg members are formed onto a radially outer end of the radially outwardly extending wall members, the resilient leg members extending axially away from the circumferential groove.

5. The filter element according to claim 1, wherein the elongated support tube extends into the flange-sided end plate opening of the first end plate.

6. The filter element according to claim 1, wherein the tubular seal ring is made of an elastomer.

7. The filter element according to claim 1, wherein the tubular seal ring is a concave curved tubular seal ring having a radially inwardly facing inner surface that is concave in an axial direction.

8. The filter element according to claim 1, wherein the first end plate and the tubular collar are made of a metal or plastic.

9. A filter element with a sealing arrangement, the filter element comprising:
a first end plate;
a second end plate spaced axially away from the first end plate;
wherein axial, as used herein, is a direction from the first end plate to the second end plate;
a filter medium circumferentially enclosing a hollow interior of the filter medium, the filter medium connected at axially opposing ends to the first end plate and the second end plate;
the first end plate having a flange-sided end plate opening extending through the first end plate;
a tubular collar formed on the first end plate and projecting axially outwardly away from the filter element in a direction axially outwardly away from the interior of the filter medium, the tubular collar circumferentially surrounding the flange-sided end plate opening, the tubular collar arranged at an axial exterior of the filter element;
a tubular seal ring mounted onto a radial interior surface of the tubular collar, spaced axially away from the hollow interior of the filter medium and at an axial outward spacing away from the first end plate, the tubular seal ring including
a central section fixedly mounted onto said radial interior surface of said tubular collar;
elastic sealing sections formed at axially opposing ends of the tubular seal ring on opposing sides of said central section, the elastic sealing sections elastically defecting in a radial direction causing a reduction each of an inner diameter of said tubular seal ring compared with said central section of said seal ring;
wherein said elastic sealing sections are elastically flexible to bend radially outwardly away from said central section;
wherein said elastic sealing sections are operative to sealably press in a radial inward direction against an exterior wall of another tubular member to be received within the tubular seal ring, the elastic sealing sections sealing radially between said tubular member and said end plate;
wherein a sealing force pressing said elastic sealing sections against said tubular member is augmented by prevailing fluid pressures acting on a radially exterior side of said elastic sealing sections;
wherein the tubular seal ring is a separate component from the tubular collar and is made of an elastic, flexible material different from the material of the tubular collar;
wherein the tubular collar includes a radially inwardly extending projection formed on the radial interior side of the tubular collar and projecting radially inwardly away from the radial interior surface of the tubular collar;
wherein the radially inwardly extending projection of the tubular collar is received against the tubular seal ring, securing the tubular seal ring in position on the tubular collar of the first end plate;
wherein the tubular seal ring has a circumferential groove forming into the radial exterior side of the tubular seal ring, the radially inwardly extending projection of the tubular collar is received into the circumferential groove of the tubular seal ring, thereby securing the tubular seal ring to the tubular collar and the first end plate.

10. The filter element according to claim 9, wherein the first end plate and tubular collar are made of a metal or plastic material.

11. The filter element according to claim 9, further comprising:
an elongated support tube extending axially from the first end plate to the second end plate through the hollow interior;
wherein the filter medium circumferentially surrounds the elongated support tube and is arranged directly on a radially outer surface of the elongated support tube in the hollow interior of the filter medium.

12. The filter element according to claim 9, wherein the tubular collar is monolithically and integrally formed with the first end plate on the axial exterior surface of the first end plate, the tubular collar a one piece continuous component of same material with the first end plate.

13. The filter element according to claim 9, wherein the tubular seal ring includes two radially outwardly extending wall members forming opposing sidewalls of the circumferential groove;
wherein resilient leg members are formed onto a radially outer end of the radially outwardly extending wall members, the resilient leg members extending axially away from the circumferential groove.

14. A filter element with a sealing arrangement, the filter element comprising:
a first end plate;
a second end plate spaced axially away from the first end plate;
wherein axial, as used herein, is a direction from the first end plate to the second end plate;
a filter medium circumferentially enclosing a hollow interior of the filter medium, the filter medium connected at axially opposing ends to the first end plate and the second end plate;
the first end plate having a flange-sided end plate opening extending through the first end plate;
a tubular collar formed on the first end plate and projecting axially outwardly away from the filter element in a direction axially outwardly away from the interior of the filter medium, the tubular collar circumferentially surrounding the flange-sided end plate opening, the tubular collar arranged at an axial exterior of the filter element;

a tubular seal ring mounted onto a radial interior surface of the tubular collar, spaced axially away from the hollow interior of the filter medium and at an axial outward spacing away from the first end plate, the tubular seal ring including:
a central section fixedly mounted onto said radial interior surface of said tubular collar;
elastic sealing sections formed at axially opposing ends of the tubular seal ring on opposing sides of said central section, the elastic sealing sections elastically defecting in a radial direction causing a reduction each of an inner diameter of said tubular seal ring compared with said central section of said seal ring;
wherein said elastic sealing sections are elastically flexible to bend radially outwardly away from said central section;
wherein said elastic sealing sections are operative to sealably press in a radial inward direction against an exterior wall of another tubular member to be received within the tubular seal ring, the elastic sealing sections sealing radially between said tubular member and said end plate;
wherein a sealing force pressing said elastic sealing sections against said tubular member is augmented by prevailing fluid pressures acting on a radially exterior side of said elastic sealing sections;
wherein the tubular seal ring is a separate component from the tubular collar and is made of an elastic, flexible material different from the material of the tubular collar;
wherein the tubular collar includes a radially inwardly extending projection formed on the radial interior side of the tubular collar and projecting radially inwardly away from the radial interior surface of the tubular collar;
wherein the radially inwardly extending projection forms a plug in bar;
wherein the tubular seal ring has a circumferential groove forming into the radial exterior side of the tubular seal ring, the radially inwardly extending projection of the tubular collar is received into the circumferential groove of the tubular seal ring, thereby securing the tubular seal ring to the tubular collar and the first end plate.

* * * * *